(12) United States Patent  (10) Patent No.: US 8,730,242 B2
Hao et al.  (45) Date of Patent: May 20, 2014

(54) PERFORMING TIME SLICE-BASED VISUAL PREDICTION

(75) Inventors: Ming C. Hao, Palo Alto, CA (US);
Umeshwar Dayal, Saratoga, CA (US);
Halldór Janetzko, Constance (DE);
Ratnesh Kumar Sharma, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 849 days.

(21) Appl. No.: 12/800,526

(22) Filed: May 17, 2010

(65) Prior Publication Data

US 2011/0279469 A1 Nov. 17, 2011

(51) Int. Cl.
*G06T 11/20* (2006.01)

(52) U.S. Cl.
USPC .......................................................... 345/440

(58) Field of Classification Search
USPC .................................... 345/440, 440.1, 440.2
See application file for complete search history.

(56) References Cited

U.S. PATENT DOCUMENTS

| | | | |
|---|---|---|---|
| 6,750,864 B1 * | 6/2004 | Anwar | 345/440 |
| 6,928,398 B1 | 8/2005 | Fang | |
| 7,406,435 B2 | 7/2008 | Aronowich | |
| 7,421,380 B2 | 9/2008 | Thiesson | |
| 2002/0184134 A1 | 12/2002 | Olsen | |
| 2008/0033991 A1 | 2/2008 | Basak | |
| 2008/0170073 A1 * | 7/2008 | Ono et al. | 345/440.1 |
| 2008/0319951 A1 | 12/2008 | Ueno | |
| 2010/0201709 A1 * | 8/2010 | Yang et al. | 345/629 |

FOREIGN PATENT DOCUMENTS

JP 2005259090 9/2005

OTHER PUBLICATIONS

Myatt, Glen J. et al., Making Sense of Data II: A Practical Guide to Data Visualization, Advanced Data Mining Methods, and Applications. Feb. 2009, Wiley, Chapter 2, pp. 19-66.*
Huang, Hank Hsin Han, Developing an Abstraction Layer for the Visualization of HSMM-Based Preedictive Decision Support, Thesis Submitted to Department of Electical Engineering and Computer Science, Aug. 2009.*
Aigner et al., Visualizing Time-Oriented Data—A Systematic View, Mar. 2007 (17 pages).
Buono et al., Interactive Pattern Search in Time Series, 2005 (11 pages).
Broberg et al., Visualization and Performance Prediction of Multithreaded Solaris Programs by Tracing Kernel Threads, IEEE 2006 (7 pages).
Bash et al., Dynamic Thermal Management of Air Cooled Data Centers, IEEE 2006 (8 pages).
Croker et al., Presentation Quality Forecast Visualization with SAS/GRAPH, NESUG 2007 (11 pages).
Hao et al., Multi-Resolution Techniques for Visual Exploration of Large Time-Series Data, IEEE 2007 (8 pages).

(Continued)

*Primary Examiner* — Hau Nguyen
*Assistant Examiner* — Ryan M Gray

(57) ABSTRACT

To perform time slice-based visual prediction, a weighted moving aggregate of data values in a data set is calculated over previous time slices to predict data values based on interactive user input. A visual accuracy indicator is generated for display to indicate a quality of prediction of data values at different times. A visualization presents data values from the data set and the predicted data values, where the data values from the data set and the predicted data values are represented as corresponding cells.

19 Claims, 8 Drawing Sheets
(4 of 8 Drawing Sheet(s) Filed in Color)

(56) References Cited

OTHER PUBLICATIONS

Ichikawa et al., A Visualization Environment for Multiple Daytime Stock Price Predictions, Sep. 2002 (7 pages).
R.E. Kalman, A New Approach to Linear Filtering and Prediction Problems, ASME 1960 (12 pages).
Patnaik et al., Sustainable Operation and Management of Data Center Chillers using Temporal Data Mining, ACM 2009 (9 pages).
www.arnetminer.org, Abstract: On building next generation data centers: energy flow in the information technology stack, 2008 (3 pages).
Sadek, et al., ATM Dynamic Bandwidth Allocation Using F-ARIMA Prediction Model, 2003 (5 pages).
James W. Taylor, Forecasting Daily Supermarket Sales Using Exponentially Weighted Quantile Regression, European Journal of Operational Research, 2007, vol. 178 (31 pages).
Hao et al., A Visual Analytics Approach for Peak-Preserving Prediction of Large Seasonal Time Series, IEEE 2011 (10 pages).
Peter R. Winters, Abstract—Management Science: Forecasting Sales by Exponentially Weighted Moving Averages, Apr. 1960 (2 pages).
Hao et al., U.S. Appl. No. 13/278,572, filed Oct. 21, 2011 entitled Computing Predicted Data According to Weighted Peak Preservation and Time Distance Biasing (26 pages).

* cited by examiner

PERFORMING TIME SLICE-BASED VISUAL PREDICTION

BACKGROUND

Data values associated with various aspects of a system (such as a network including network nodes, software components, and database components) can be collected over time. For example, sensors or monitors can be provided in a network to collect measurements of various parts of the network. Alternatively, data can be collected regarding various other operational aspects of an organization, such as data relating to sales operations, human resource operations, and so forth. The amount of data collected can be relatively large, making understanding and analysis of the collected data difficult.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Some embodiments are described with respect to the following figures.

DETAILED DESCRIPTION

In an organization (such as a company, an educational organization, a government agency, a department or division of any of the foregoing, or another organization), data can be collected regarding various aspects of the organization. Examples of collected data include measurements taken by network monitors or sensors (e.g., measurements relating to processor utilization, storage system utilization, network utilization, system component temperature, power usage, etc.), data relating to sales activity, revenue data, and/or other types of data. The amount of data collected for an organization can be relatively large, making understanding or analysis of such data relatively difficult.

Some examples of analysis that may be desired include predictions of data values based on preexisting (historical) data values to find patterns, trends, or other characteristics in data. For example, an organization may wish to predict power consumption of a system in a future time period based on historical power consumption data. Alternatively, a supply chain company may wish to predict the number of products that should be stored at various sites for a next time period based on historical sales data.

Although various statistical, model-based techniques exist for performing data prediction, such statistical model-based techniques may use assumptions that do not fit real-world data, making predictions inaccurate in many cases. Moreover, outputs produced by conventional techniques are often provided in a manner that allows for efficient presentation of large amounts of data. In addition, conventional techniques do not allow for human involvement in making data prediction more accurate.

Figure 1:
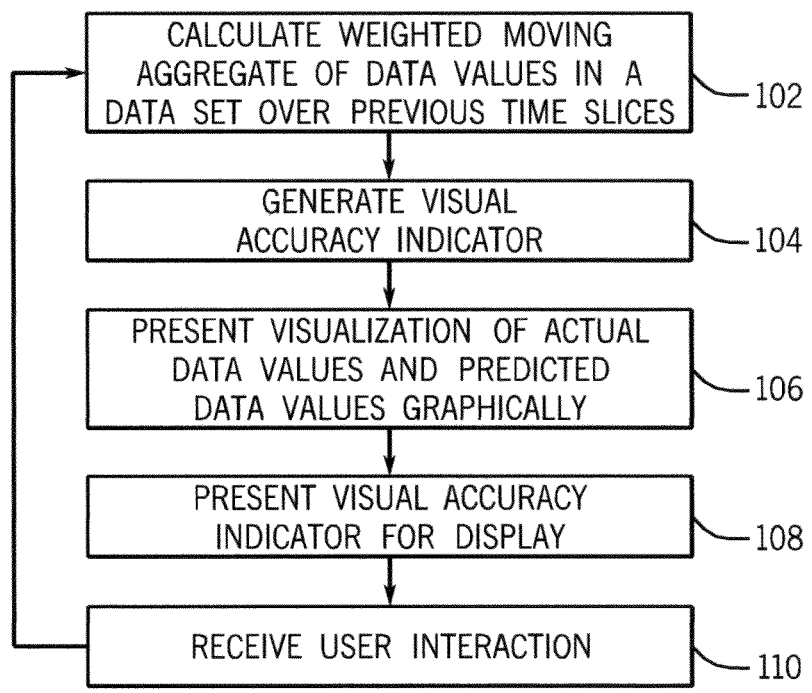
FIG. 1 is a flow diagram of a process of performing a time slice-based visual prediction process, according to some embodiments.

In accordance with some embodiments, time slice-based visual prediction techniques are provided. FIG. 1 is a flow diagram of a time slice-based visual prediction technique according to some embodiments. A weighted moving aggregate of data values in a data set over previous time slices is calculated (at 102) to predict data values. The weighted moving aggregate of such data values provides a predicted data value.

A "time slice" refers to some period of time associated with data values in a data set. An aggregate of data values refers to a computed value derived from a combination of two or more data values. One example of an aggregate is an average. Other examples of aggregates include a median, a maximum, a minimum, a sum, and so forth. A moving aggregate of data values refers to performing an aggregate of data values in different combinations of time slices as more incoming data is received into the data set. For example, a first moving aggregate (computed at a first point in time) can be based on data values in previous time slices A, B, C, and D. A second moving aggregate (computed at a later point in time when new data comes in) can be based on data values in previous time slices B, C, D, and E. In a more specific example, time slices A, B, C, and D may be hour 7 in each of March 2, March 3, March 4, and March 5, while time slices B, C, D, and E may be hour 7 in each of March 3, March 4, March 5, and March 6.

A weighted moving aggregate refers to assigning different weights to different time slices, such as based on recency of data values to a current time. For example, a higher weight can be assigned to data values in a more recent time slice, and a lower weight can be assigned to data values in earlier time slice. The weights are applied to the data values and the corresponding time slices prior to performing the aggregate.

In some implementations, the weighted moving aggregate includes a weighted moving average. In other implementations, other types of weighted moving aggregates can be used, such as computing a weighted moving mean, weighted moving sum, or other weighted moving aggregate of data values in the data set for performing data prediction. By computing the weighted moving aggregate over time slices repeating in previous time frames, seasonality effects of data can be considered. Seasonality refers to repeating patterns over time (such as increased sales during the year-end holiday season, increased system activities during business hours, etc.).

A visual accuracy indicator is also generated (at 104) to indicate respective qualities of prediction of data values at different times. For a particular time point, a comparison can be made between an actual data value and a predicted data value to determine how close the actual data value is to the predicted data value. A predicted data value that is closer to an actual data value indicates a higher quality of prediction, whereas a predicted data value that is farther away from the actual data value is an indication of a lower quality of prediction.

A visualization is presented (at 106) of actual data values from the data set as well as predicted data values calculated at 102. The data values are represented graphically in either a cell-based visualization or in a line chart visualization. A cell-based visualization includes multiple cells, where each cell represents a corresponding data value, and each cell has a characteristic (e.g., color, shading, shape, etc.) that varies according to the corresponding data value. On the other hand, a "line chart" refers to a graph that represents values of an attribute as a function of a predefined dimension, such as time. The visual accuracy indicator is also presented (at 108) for display.

As further depicted in FIG. 1, user interaction can be received (at 110). For example, a user may make a selection (e.g., mouse click, rubber-band action, etc.) in the visualization or with respect to the visual accuracy indicator. The user interaction may cause tasks 102-108 to be repeated under a different condition (such as user selection of a different smoothing interval as discussed below). For example, this can cause the predicted data values calculated at 102 to be varied based on interactive user input.

In accordance with some implementations, to remove noise from data values in the data set prior to performing prediction of data values, smoothing is applied to the data values in the data set. The smoothing can be performed based on calculating a moving aggregate (such as a moving average). The moving aggregate to perform the smoothing is different from the calculation of the weighted moving aggregate to predict a data value, as discussed above. The smoothing moving aggregate is performed to replace an actual data value in the data set with a replacement data value (the calculated moving aggregate). For example, given a data set having data values d1, d2, . . . , dn−2, dn−1, dn at corresponding time points t1, t2, . . . , tn−2, tn−1, tn, the smoothing moving aggregate for dn−1 can be an aggregate (e.g., average) of the last M values (M>1), e.g., aggregate of dn−2, dn−3, . . . , dn−M−1 (which produces a smoothed data value to replace dn−1). On the other hand, the smoothing moving aggregate for dn can be an aggregate of dn−1, dn−2, . . . , dn−M (which produces a smoothed data value to replace dn).

In accordance with some implementations, to adjust the level of smoothing desired, the length (M) of each of the smoothing time interval over which the weighted moving aggregate is calculated is adjustable based on user input. In one example, the adjustment of the smoothing time interval can be based on user adjustment of a moveable slider presented in a visualization. Different smoothing time intervals can be selected for different applications, which can have different specifications. Selection of different smoothing time intervals can be based on domain knowledge that a user may have. The slider in the visualization is adjustable by a user input device to vary the length of the time frame over which smoothing is performed.

Figure 2A:
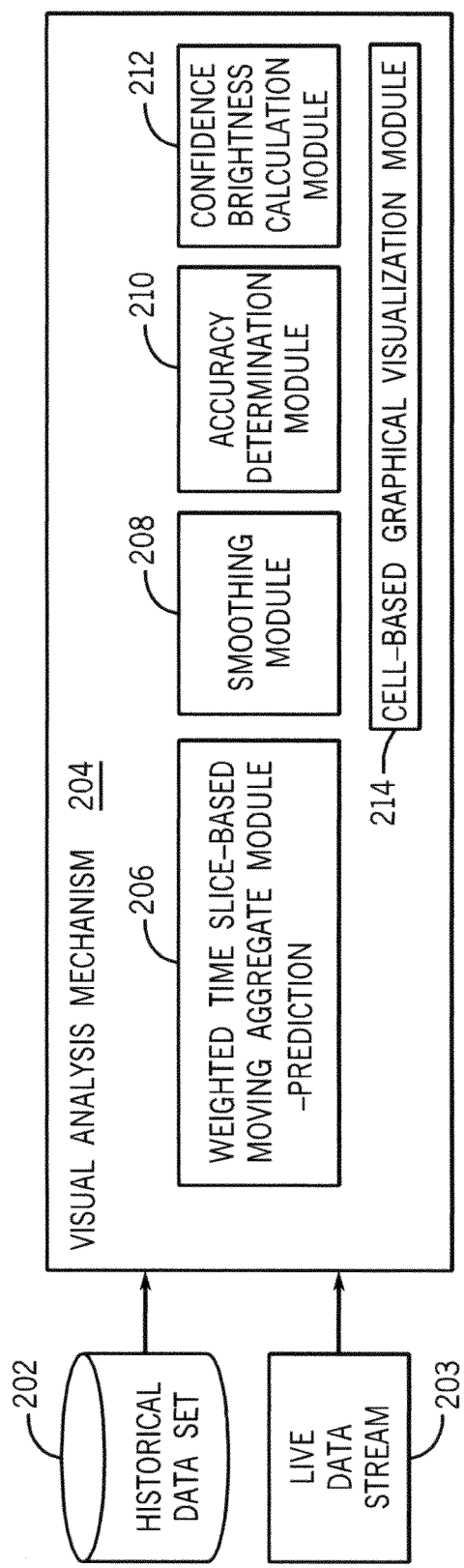
FIG. 2A is a schematic diagram of a system incorporating a time slice-based visual prediction mechanism, according to some embodiments.
Figure 2B:
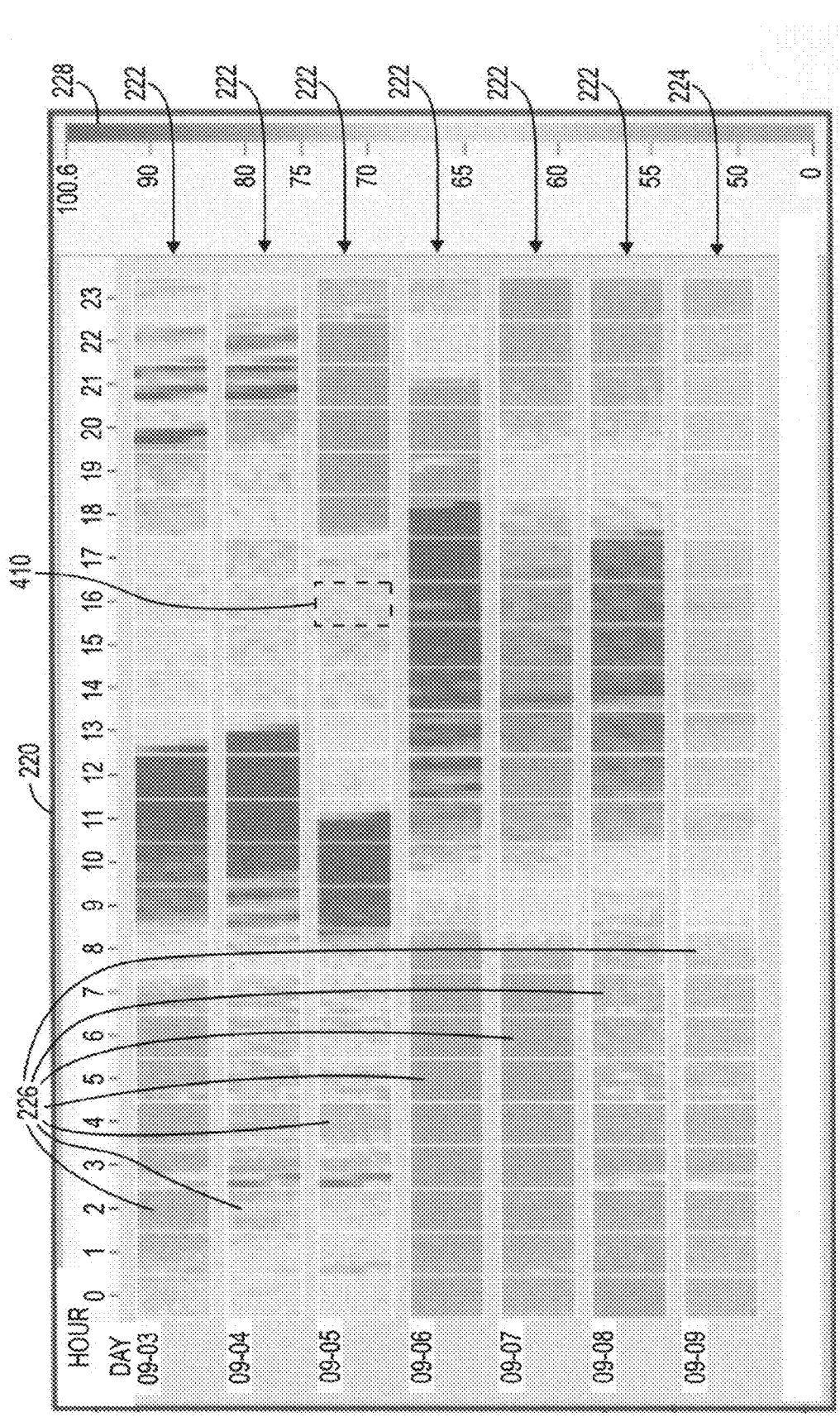
FIG. 2B is a graphical visualization of an output of the system of FIG. 2A according to some embodiments.

FIG. 2A is a schematic diagram of a system according to some implementations, while FIG. 2B illustrates an example visualization screen output by the system of FIG. 2A. There are two possible inputs to the system of FIG. 2A. A first input includes a historical data set 202 containing data values already received can be stored in storage media, such as disk-based storage device(s) and/or integrated circuit or semiconductor memory device(s). Alternatively, a second input includes a live data stream 203 that is received in real-time by the system. As used here, the phrase "data set" refers to either the historical data set 202 or the live data stream 203. A visual analysis mechanism 204 reads data values from the historical data set 202 or live data stream 203.

The visual analysis mechanism 204 is able to perform the tasks of FIG. 1, in some implementations. The visual analysis mechanism 204 includes a weighted time slice-based moving aggregate module 206, which applies weighted moving aggregates over time slices to perform data prediction.

In addition, the visual analysis mechanism 204 includes a smoothing module 208 to apply data smoothing to remove noise, as discussed above. Alternatively, the visual analysis mechanism 204 includes an accuracy comparison module 210 for producing the visual accuracy indicator discussed above.

The visual analysis mechanism 204 also includes a confidence brightness calculation module 212, which is able to adjust brightnesses of data collections presented in a visualization based on confidence levels of the data values in the corresponding data collections. Different brightness indicate different levels of confidence associated with predictions of data values. For example, the confidence brightness calculation module 212 causes the brightness of a predicted data collection to be set according to a degree of expected accuracy associated with prediction of the data values in the predicted data collection.

The visual analysis mechanism 204 also include a cell-based graphical visualization module 214 to produce graphical representations of corresponding data collections, including actual data collection(s) and predicted data collection(s), in graphical format with cells that represent respective data values.

Although the visual analysis mechanism 204 is depicted as having certain modules, it is noted that some of the modules can be omitted or replaced with other modules in other implementations.

FIG. 2B shows an example graphical visualization 220 that is generated by the cell-based graphical visualization module 214. In the graphical visualization 220, the data collections that are visualized include multiple data collections in the form of multiple time series 222 of actual data values from the historical data set 202 or live data stream 203, as well as a predicted data collection in the form of a predicted time series 224 that contains predicted data values (as generated by cooperation of the weighted time slice-based moving aggregate module 206 and the smoothing module 208).

In the example graphical visualization 220 shown in FIG. 2B, each time series 222 or 224 represents data values in a corresponding day. Moreover, within each time series 222 or 224, multiple blocks 226 are included, where each block 226 corresponds to a respective hour of the day. Within each block 226 is arranged an array of cells that correspond to respective individual data values (or groups of data values). For example, each data value may have been collected in a corresponding one-minute interval. Each cell is assigned a color that represents the corresponding data value. Different colors represent different data values. A color scale 228 on the right side of the graphical visualization 220 indicates a color scale that maps different colors to different data values.

More generally, each time series (222, 224) represents data values contained within a first time interval, each block 226 within a time series represents data values within a second, different time interval, and each cell within a block 226 represents a data value collected in a third time interval different from the first and second time intervals.

In the example visualization 220, the predicted time series 224 has a transparency layer over the predicted time series 224, where the transparency layer is adjustable to vary the perceived brightness of the predicted time series 224. The adjustment of the transparency layer is performed by the confidence brightness calculation module 212. If the confidence brightness calculation module 212 determines that the accuracy of the predicted time series 224 is relatively high, then the brightness of the predicted time series 224 is set higher; on the other hand, if the confidence brightness calculation module 212 determines that the accuracy of the predicted time series 224 is relatively low, then the brightness of the predicted time series 224 is set lower.

The graphical visualization 220 is continually updated based on iterative executions of the modules 206, 208, 210, 212, and 214, as additional data values are received into the historical data set 202 or received through the live data stream 203 (FIG. 2A).

Figure 3:
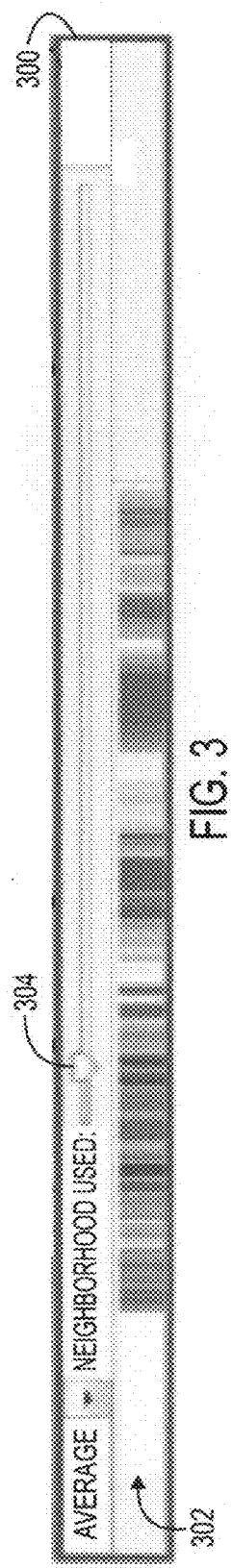
FIG. 3 illustrates a visual accuracy indicator according to some embodiments.

In addition to the graphical visualization 220 of FIG. 2B that includes actual and predicted time series (222, 224), a visual accuracy indicator 300 as shown in FIG. 3 can also be presented by the visual analysis mechanism 204 according to some implementations.

The visual accuracy indicator 300 is produced by the accuracy determination module 210 (FIG. 2A). The visual accuracy indicator 300 has a row or line 302 of accuracy indications, which in FIG. 3 are in the form of different colors for representing different accuracy levels for respective time points. In some examples, an accuracy indication having a light shading (e.g., light red or light blue or white in FIG. 3) indicates that the corresponding predicted data value (at a particular time point) is relatively close to the respective actual data value (at the particular time point). In some examples, an accuracy indication that is white indicates that the predicted data values exactly match the actual data value. On the other hand, an accuracy indication having a darker shading (e.g., dark red or dark blue in FIG. 3) indicates that the corresponding predicted data value at the particular time point is relatively inaccurate (in other words, the predicted data value is farther from the actual data value). In some examples, red indicates that predicted data values are higher than actual data values (in other words the predicted data values are over-predicted). On the other hand, blue indicates that predicted data values are under-predicted (in other words, the predicted data values are lower than actual data values).

In accordance with some implementations, the visual accuracy indicator 300 can also include an adjustable slider 304 to modify the smoothing time interval over which the smoothing moving aggregate is calculated for smoothing actual data values. The adjustable slider 304 can be moved in response to a user input device (such as a mouse, touchpad, or other pointer device), or in response to input entered into a touch screen or a keyboard. The adjustment of the adjustable slider 304 can be made by the user in response to the row 302 of accuracy indications regarding accuracy of predicted data values. Moving the slider 304 to the right means that the length of the smoothing time interval over which the smoothing moving aggregate is calculated is increased; on the other hand, moving the slider 304 to the left means that the length of the time interval over which the smoothing moving aggregate is calculated is reduced.

Moving the slider 304 causes different smoothing to be applied to the actual data values (by varying the smoothing time interval), which provides different smoothed data values from which prediction is performed. By moving the slider 304, a user can see the accuracy indications (302) change—a lightening of the shading of the accuracy indications indicates to the user that predicted data values are more accurate.

The accuracy indications provided in the visual accuracy indicator 300 are produced based on corresponding differences between predicted data values and actual data values. At each time point represented by a corresponding accuracy indication in the visual accuracy indicator 300, a predicted data value is compared with an actual data value, and the difference between the predicted and actual data values is used for producing the corresponding accuracy indication (in the form of a color, for example). In some implementations, the differences between predicted data values and actual data values are normalized using standard deviation. The normalized differences are then mapped by a color map to corresponding accuracy indications, in the form of different colors and brightness. Dark colors indicate larger differences, while lighter colors (or white) indicate smaller differences. Red and blue indicate over versus under prediction, respectively, as noted above.

Figure 4:
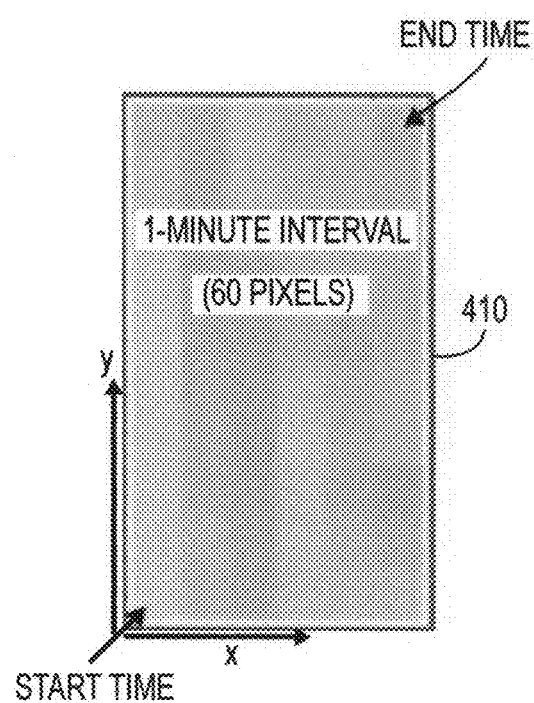
FIG. 4 depicts an example block of cells for visualizing data values according to some embodiments.

FIG. 4 illustrates a block 410 of cells (corresponding to block 410 depicted in FIG. 2B). Each time series of FIG. 2B has multiple blocks, where each block in turn has multiple cells. In the example block 410 of FIG. 4, a one hour interval is depicted, which has a collection of 60 cells each corresponding to one-minute intervals. In other examples, other intervals can be represented by the block 410 and the cells. The cells are ordered from bottom to top and from left to right in terms of time, in some examples. For example, the lower, left corner indicates the start time, while the upper, right corner indicates the end time, of the cells represented in each block 410.

Figure 5:
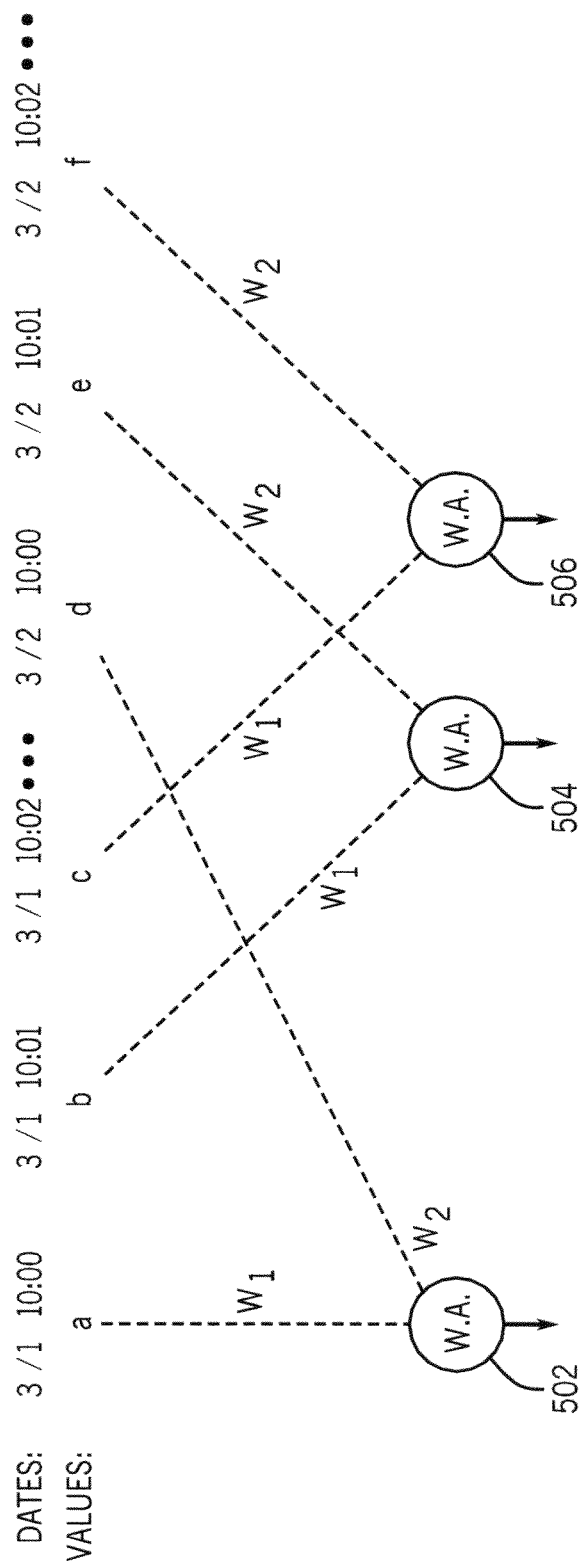
FIG. 5 illustrates an example computation of a weighted moving aggregate, according to some embodiments.

FIG. 5 shows an example of computation of a weighted moving aggregate, according to some implementations. For example, for an identified time slice, such as the one-minute time slice corresponding to time 10:00, an aggregate (e.g., average) is computed based on data values in the 10:00 time slice occurring in each of the previous N days in the data set (N>1). In other words, the weighted moving aggregate for prediction is calculated based on a weighted moving aggregate of data value at 10:00 for days T−1, day T−1, . . . , day T−N (where T is a current time). Similarly, for another time slice 10:01, the aggregate is performed over the data values in the 10:01 time slice occurring over previous N days (days T−1, day T−1, . . . , day T−N).

In the FIG. 5 example, a sequence of data values starts on 3/1 10:00, and continues in one-minute time intervals to 3/2 10:02. Data value a occurs at 3/1 10:00, data value b occurs at 3/1 10:01, data value c occurs at 3/1 10:02, data value d occurs at 3/2 10:00, data value e occurs at 3/2 10:01, and data value f occurs at 3/2 10:02. In the FIG. 5 example, the data values are collected at one-minute intervals. In a given day, there are 24·60 one-minute time slices. Over a number of days, each particular one-minute time slice repeats (e.g., 10:01 occurs on 3/1 and repeats on 3/2). Data values that occur within a particular time slice (e.g., a one-minute time slice as shown in FIG. 5) that occurs in different time frames (e.g., one-day time frames in FIG. 5) are aggregated according to the weighted aggregate technique. In the example of FIG. 5, the particular time slice 10:00 that occurs on 3/1 has data value a and the particular time slice 10:00 that occurs on 3/2 has data value d. A weight $W_1$ is applied to a, and a different weight $W_2$ is applied to d. Since the particular time slice 10:00 on 3/2 is more recent than the particular time slice 10:00 on 3/1, the weight $W_2$ is greater than $W_1$.

The weighted aggregate for time slice 10:00 is performed at 502 as follows:

$$W.A.(10:00) = W_1 \cdot a + W_2 \cdot d + \ldots \quad \text{(Eq. 1)}$$

Similar weighted aggregates are performed at 504 and 506 for respective particular time slices 10:01 and 10:02.

In more specific implementations, the weights are decreasing exponentially with increasing time. In such implementations, if there are additional values g for 3/3 at 10:00, j for 3/4 at 10:00, and m for 3/5 at 10:00, then Eq. 1 is modified as follows:

$$W.A.(10:00)=0.5*(0.5*(0.5*(0.5*a+0.5*d)+0.5*g)+0.5*j)+0.5*m \quad \text{(Eq. 2)}.$$

Effectively, the weighted average is according to a recursive calculation of:

$$alreadyCalculatedAverage=(0.5*alreadyCalculatedAverage)+0.5*currentSeenValue.$$

The parameter alreadyCalculatedAverage is the weighted average of all values in a particular time slice seen so far. As a new value is received, alreadyCalculatedAverage is multiplied by 0.5 and summed with 0.5*currentSeenValue, where currentSeenValue is the new value for the particular time slice. In other implementations, instead of using 0.5, a different constant can be used instead for computing alreadyCalculatedAverage.

More generally, each of multiple time frames has plural time slices, where each time slice repeats in the time frames. Data values in a particular time slice that repeats in the multiple time frames are aggregated using the moving weighted aggregate technique. As noted above, by computing the weighted moving aggregate over time slices repeating in previous time frames, seasonality effects of data can be considered. Seasonality refers to repeating patterns over time (such as increased sales during the year-end holiday season, increased system activities during business hours, etc.).

The weighted aggregate according to Eq. 1 is applied over some number N (N>1) time frames. As additional (new) input data is received, the weighted aggregate of Eq. 1 may be computed based on a new group (new window) of N data values from the most recent N time frames (in other words, the window of N data values over which the weighted aggregate is computed is shifted). For example, in FIG. 5, when data values for a new day is received, then the weighted moving aggregate can drop data values for 3/1 for computation of the weighted moving aggregate. Alternatively, instead of dropping data values, the older data values can be assigned increasingly lower weights.

Figure 6:
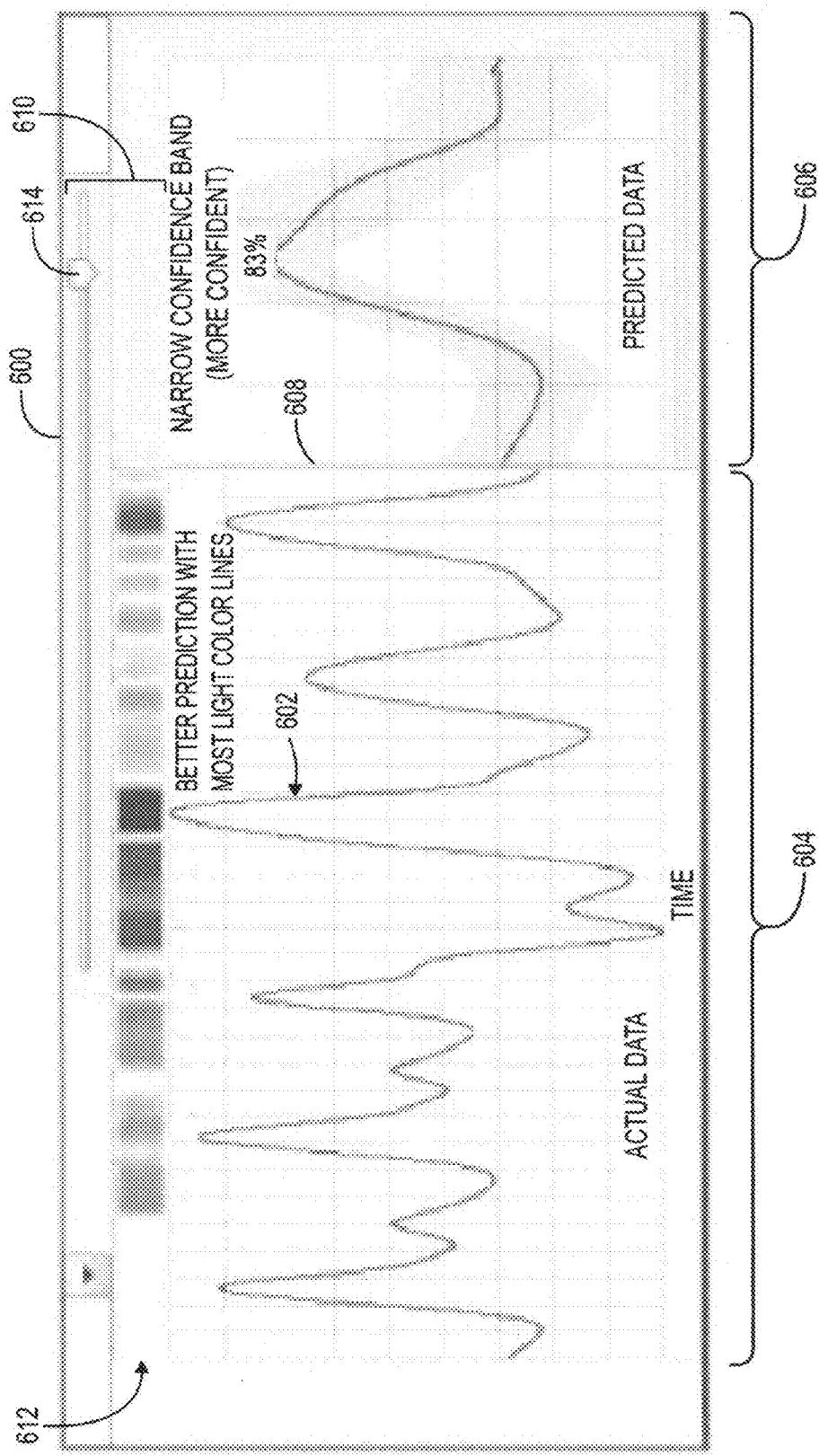
FIG. 6 depicts an example visualization showing predicted data values along with visual accuracy indicators, according to some embodiments.

FIG. 6 shows a different example graphical visualization 600 that has a curve 602 with two portions: a first portion 604 containing actual data values (from the historical data set 202 or live data stream 203 of FIG. 2A), and a second portion 606 containing predicted data values (calculated by the visual analysis mechanism 204 of FIG. 2A). The example visualization 600 is an example of a line chart representation in accordance with some implementations. A divider 608 divides the portion 604 from the portion 606. In addition, a visual accuracy indicator 610 contains a row 612 of accuracy indications for different time points of the portion 604. In addition, the visual accuracy indicator 610 has an adjustable slider 614, for adjusting lengths of the smoothing time interval over which the weighted moving aggregate is calculated. The slider 614 when adjusted by a user allows the user to steer (on a real-time basis) the visual prediction process to achieve more accurate prediction results. Real-time (or live) steering of the visual prediction process refers to adjustment of visual prediction process as data is received and visualized and predicted.

By using the time slice-based visual prediction techniques according to some implementations, a user-adjustable technique is provided for predicting data values based on historical data values or a live data stream, where user adjustment of data smoothing can lead to improved prediction. Interactive visualizations can be presented to the user to allow the user to view, in real time, predictions that are made. The user is also presented with accuracy indications that depict accuracies of predictions made in the past, so that the user can adjust smoothing intervals to improve prediction accuracy. In addition, the time slice-based visual prediction techniques according to some implementations allows data predictions to be made without having to use predefined models, which may not fit real world data.

Figure 7:
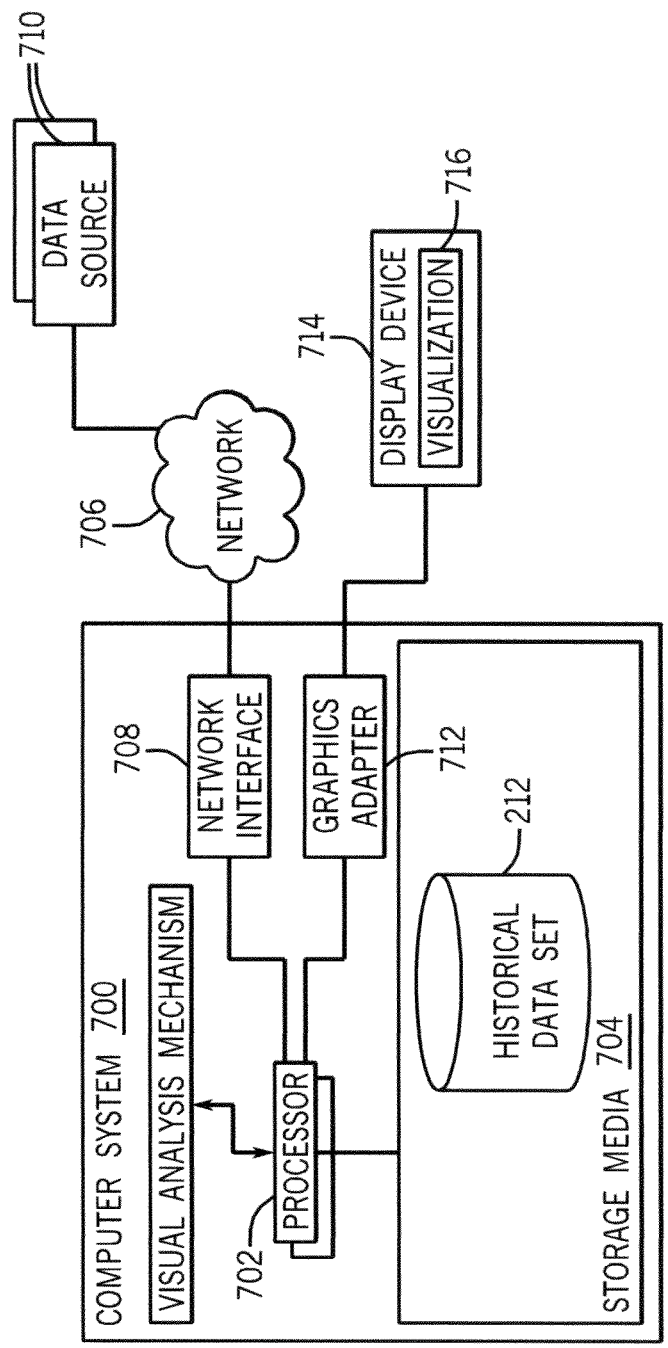
FIG. 7 is a block diagram of an example system incorporating some embodiments.

FIG. 7 is a block diagram of an example arrangement of a computer system 700 that includes the visual analysis mechanism 204 according to some implementations. The computer system 700 can be a single computer node, or distributed computer nodes. The visual analysis mechanism 204 is implementable as machine-readable instructions executable on processor(s) 702. The processor(s) 702 is (are) connected to storage media 704, which contains the historical data set 212. In alternative implementations, instead of storing the historical data set 212 in the storage media 704 of the computer system 700, the historical data set 212 can be stored at a remote location accessible over a network 706.

The processor(s) 702 is (are) connected to a network interlace 708 to allow the computer system 700 to communicate over the data network 706 with one or plural data sources 710. The data source(s) 710 stores or collects various data values to be analyzed by the visual analysis mechanism 204.

A graphics adapter 712 is connected to the processor(s) 702. The graphics adapter 712 is in turn connected to a display device 714. The graphics adapter 712 is used to generate image data for presentation in the display device 714, in response to input data from the visual analysis mechanism 204. In accordance with some implementations, a graphical visualization 716, such as any of the graphical visualizations discussed above, is presentable in the display device 714.

Machine-readable instructions discussed above are loaded for execution on a processor (e.g., 702). A processor can include a microprocessor, microcontroller, processor module or subsystem, programmable integrated circuit, programmable gate array, or another control or computing device.

Data and instructions are stored in respective storage devices, which are implemented as computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method of performing time slice-based visual prediction, comprising:
   presenting for display a user-adjustable moveable element;
   applying smoothing to data values in a data set to generate smoothed data values, wherein moving the moveable element causes a smoothing time interval over which the smoothing is applied to change in length;
   calculating, by at least one processor, a weighted moving aggregate of the smoothed data values over previous time slices to predict data values;
   generating, by the at least one processor, a visual accuracy indicator to indicate a quality of prediction of the predicted data values at different times, wherein the visual accuracy indicator includes accuracy indications representing respective accuracies of the predicted data values, wherein moving the moveable element causes visual changing of the accuracy indications;
   presenting, in a visualization for display by a display device, data values from the data set and the predicted data values, wherein the data values from the data set and the predicted data values are represented as corresponding cells; and
   presenting the visual accuracy indicator including the accuracy indications for display by the display device.

2. The method of claim 1, wherein the moveable element is a slider adjustable by a user input device.

3. The method of claim 1, further comprising performing real-time steering of the time slice-based visual prediction by adjusting the moveable element.

4. The method of claim 1, further comprising adjusting a brightness of a data collection containing the predicted data values in the visualization, wherein the brightness is varied to provide different indications of confidence in accuracies of the predicted data values in the data collection.

5. The method of claim 1, wherein representing the data values from the data set and the predicted data values comprises representing the data values from the data set and the predicted data values as a cell-based visualization in which the cells are assigned colors to represent different data values.

6. The method of claim 1, wherein presenting the visual accuracy indicator comprises presenting a row including the accuracy indications to represent the accuracies at corresponding time points.

7. The method of claim 6, wherein the accuracy indications in the visual accuracy indicator comprise different shading for indicating different accuracies.

8. The method of claim 7, wherein the accuracy indications in the visual accuracy indicator comprise different colors for indicating over-prediction and under-prediction.

9. The method of claim 6, further comprising:
   for each of the time points, comparing a corresponding predicted data value at the time point to an actual data value from the data set at the time point to compute an accuracy of the corresponding predicted data value.

10. An article comprising at least one non-transitory machine-readable storage media storing instructions that upon execution cause a computer system to:
    present for display a moveable slider adjustable by a user input device;
    apply smoothing to actual data values to generate smoothed data values, wherein adjusting the moveable slider causes a smoothing time interval over which the smoothing is applied to change in length;
    predict data values based on the smoothed data values using a technique that calculates a weighted moving aggregate of the smoothed data values in respective time slices;
    compute accuracies of the predicted data values; graphically present in a visualization the actual data values and the predicted data values; and
    present a visual accuracy indicator including accuracy indications to represent the respective computed accuracies of the predicted data values at different times, wherein moving the slider causes visual changing of the accuracy indications.

11. The article of claim 10, wherein calculating the weighted moving aggregate of the smoothed data values in respective time slices comprises:
    for a particular time slice that repeats in each of plural time frames, assigning weights to the corresponding smoothed data values in the particular time slices in the respective plural time frames, to produce respective weighted data values; and
    aggregating the weighted data values to provide a predicted data value for the particular time slice.

12. The article of claim 11, wherein the plural time frames include a window of N time frames, where N is greater than one, and wherein as new actual data values are received, the window of N time frames over which the weighted moving aggregate is calculated is shifted.

13. The article of claim 10, wherein the visualization includes a first collection of the actual data values, and a second collection of the predicted data values, and wherein the instructions upon execution cause the computer system to further:
    set a brightness for the second collection in the visualization according to a confidence in accuracy of the predicted data values.

14. The article of claim 10, wherein calculating the weighted moving aggregate comprises calculating a weighted moving average of the smoothed data values.

15. The article of claim 10, wherein the visualization includes a plurality of data collections containing the actual data values and a predicted data collection containing the predicted data values, wherein each of the plurality of data collections and the predicted data collection includes cells representing time periods, the method further comprising:
    ordering the cells in each of the plurality of data collections and the predicted data collection according to time.

16. A computer system comprising:
    a storage media to store a data set; and
    at least one processor to:
    present for display a user-adjustable moveable element,
    apply smoothing to actual data values in the data set to produce smoothed data values, wherein moving the moveable element causes a smoothing time interval over which the smoothing is applied to change in length;
    calculate a weighted moving aggregate of the smoothed data values to produce predicted data values, wherein calculating the weighted moving aggregate comprises:
    for a given time slice that repeats in each of plural time frames, assign weights to the smoothed data values in the given time slices, to produce weighted data values; and
    aggregate the weighted data values to compute a corresponding predicted data value;
    generate a visual accuracy indicator having a plurality of accuracy indications to indicate respective accuracies of the predicted data values, wherein the plurality of accuracy indications are determined based on comparisons of the predicted data values to actual data values, wherein the plurality of accuracy indications have different shadings to indicate different accuracies, and different colors to indicate over- prediction, under-prediction, and exact prediction, and wherein moving the moveable element causes visual changing of the accuracy indications; and present the visual accuracy indicator for display.

17. The method of claim 4, further comprising:

presenting a transparency layer over the cells representing the predicted data values, wherein adjusting the brightness comprises adjusting a brightness of the transparency layer, wherein a higher brightness of the transparency layer indicates a higher accuracy of the predicted data values.

18. The article of claim 13, wherein the instructions upon execution cause the computer system to further present a transparency layer over cells representing the predicted data values, wherein setting the brightness comprises adjusting a brightness of the transparency layer, wherein a higher brightness of the transparency layer indicates a higher accuracy of the predicted data values.

19. The computer system of claim 16, wherein the at least one processor is to further:

present a transparency layer over cells in the visualization representing the predicted data values; and adjust a brightness of the transparency layer, wherein a higher brightness of the transparency layer indicates a higher accuracy of the predicted data values.

* * * * *